US007526598B2

(12) United States Patent
Stern et al.

(10) Patent No.: US 7,526,598 B2
(45) Date of Patent: Apr. 28, 2009

(54) EFFICIENT FLASH MEMORY DEVICE DRIVER

(75) Inventors: Ori Stern, Elad (IL); Menahem Lasser, Kohav Yair (IL)

(73) Assignee: SanDisk IL, Ltd., Kfar Saba (IL)

( * ) Notice: Subject to any disclaimer, the term of this patent is extended or adjusted under 35 U.S.C. 154(b) by 730 days.

(21) Appl. No.: 10/376,504

(22) Filed: Mar. 3, 2003

(65) Prior Publication Data

US 2004/0177054 A1 Sep. 9, 2004

(51) Int. Cl.
*G06F 12/00* (2006.01)
*G06F 12/08* (2006.01)

(52) U.S. Cl. ................... 711/100; 711/111; 711/150; 711/151; 710/7; 710/22; 710/28; 710/36; 710/39; 710/40; 710/46; 707/1; 707/2; 707/3

(58) Field of Classification Search ................ 711/100
See application file for complete search history.

(56) References Cited

U.S. PATENT DOCUMENTS

| | | | |
|---|---|---|---|
| 5,404,485 | A | 4/1995 | Ban |
| 5,937,425 | A | 8/1999 | Ban |
| 6,744,692 | B2 * | 6/2004 | Shiota et al. ........... 365/230.03 |
| 6,810,440 | B2 * | 10/2004 | Micalizzi et al. .............. 710/19 |
| 6,851,074 | B2 * | 2/2005 | Miloiicic et al. .............. 714/20 |

OTHER PUBLICATIONS

Microsoft Computer Dictionary, 1999, Microsoft Press, Fourth Edition, p. 170.*
Microsoft Computer Dictionary, Copyright 1999, Microsoft Press, Fourth Edition, pp. 28 and 154.*
Microsoft Computer Dictionary, 1999, Microsoft Press, Fourth Edition, p. 154.*
Andrew S. Tanenbaum; Structured Computer Organization; 1999; Prentice Hall; Fourth Edition; p. 8.*

* cited by examiner

*Primary Examiner*—Stephen C Elmore
*Assistant Examiner*—Midys Rojas
(74) *Attorney, Agent, or Firm*—Mark M. Friedman (57) ABSTRACT

A driver for a data storage device includes an access command and a verification command. The access command initiates an access (write, erase or read) of the data storage device while allowing a calling application to continue running without having to wait for the completion of the access. The verification command queries a preceding access. If the query indicates failure of the preceding access, the verification command repeats the preceding access until the preceding access succeeds. The verification command is called by the access command before the access command initiates a new access. The verification command also is called by an application following a sequence of related access command calls. A write access command saves the data to be written in a memory separate from the data storage device, in case the verification command needs that data to repeat a failed write.

53 Claims, 5 Drawing Sheets

EFFICIENT FLASH MEMORY DEVICE DRIVER

FIELD AND BACKGROUND OF THE INVENTION

The present invention relates to the management of storage media and, more particularly, to a driver that makes efficient use of a storage medium, such as a flash memory device, accesses of which are relatively slow and must be checked for successful completion.

Flash memory devices are compact, non-volatile data storage devices that are commonly used as substitutes for block memory devices such as hard disks. There are two main types of flash memory devices: NOR flash devices and NAND flash devices.

In a NOR flash device, reading is random access and fast (tens of nanoseconds), similar to RAM. Writing also is random access as in RAM, but is somewhat slow (a few microseconds). Erasing must be done in relatively large units called "blocks", and is very slow (a few hundred milliseconds).

In a NAND flash device, reading is serial rather than random access, and is somewhat slow (typically 10 to 15 microseconds). Writing must be done in medium-size units called "pages" and is slow (a few hundred microseconds). Erasing must be done in blocks, and is slow (a few milliseconds).

Note that the use of the word "block" to refer to the erasable units of a flash memory device should not be confused with the use of the word "block" in the term "block memory device". The "block" nature of a block memory device refers to the fact that the device driver exports an interface that exchanges data only in units that are integral multiples of a fixed-size, smaller unit that typically is called a "sector".

In order for a flash memory device to emulate a block memory device, a software flash device driver, also called a flash management system, must be provided. The flash device driver exports the Application Programming Interface (API) of a block device driver and handles all the flash management details internally. Such a flash device driver allows application software that stores data on hard disks, for example by using a file system such as Microsoft FAT or NTFS, to access a flash memory device as though it were a hard disk, with no changes to the software applications. Exemplary flash device drivers are described by Ban in U.S. Pat. Nos. 5,404,485 and 5,937,425, both of which are incorporated by reference for all purposes as if fully set forth herein. Typically, such flash device drivers use some form of address mapping to translate the logical or virtual addresses used by the higher level software to the physical addresses of the flash memory device hardware. A flash device driver may include its own file system, may operate under the native file system of the host operating system, or may interact directly with applications and so bypass the use of a file system.

A flash device driver receives calls from application software that requests the reading and writing of data in units of sectors. Typically, a sector is 512 bytes long. A request may be for a single sector or for multiple sectors per call. Each sector corresponds, in size, to a physical portion of the flash memory device that is referred to herein as a "page". In the case of a NAND flash device, the pages are discrete physical units of the device. In the case of a NOR flash device, in which both reading and writing is random access, a "page" is just a physical portion of the device that is capable of storing a sector's worth of data, and the various "pages" are not necessarily separate and discrete.

A typical format for a command that reads a single sector is:
Status=ReadSector(bDriveID,wSectorNumber, pDataBuffer) and a typical format for a command that writes a single sector is:
Status=WriteSector(bDriveID,wSectorNumber, pDataBuffer) where Status is set to a success/failure code on return from the call; bDriveID identifies the data storage device (to allow more than one data storage device to be used); wSectorNumber identifies the logical sector number to be read from or to be written to; and pDataBuffer is a pointer that points to a buffer that receives that data read from the data storage device or that contains the data to be written to the data storage device.

All prior art flash device drivers process such requests by accessing a flash memory device according to the specifics of that device, and then waiting for the completion of the relatively slow flash device operation. The following pseudocode illustrates what a prior art flash device driver must do in a WriteSector command:

Start WriteSector:
    Translate wSectorNumber to the physical address currently allocated for that logical address.
    Send one command byte to the flash memory device, indicating the start of data input.
    Send four bytes of physical address to the flash memory device.
    Send the data bytes (typically including both the application software data bytes from pDataBuffer and some control bytes attached to the data by the flash device driver) that are to be written to the flash memory device.
    Send one command byte to the flash memory device to initiate auto-programming by the flash memory device. While the flash memory device is busy programming the data bytes into the flash cells, the flash memory device displays a "busy" status.
    Wait until the "busy" status of the flash memory device terminates. Typically, this is done by looping over a command that reads the flash memory device status and exits the loop if the status is not "busy".
    Query the flash memory device for operation success.
    If success:
        Then return from the call while setting Status to the success code
    Else:
        Mark the failed physical page as bad to avoid reusing that page.
        Re-define the address mapping so that wSectorNumber is mapped to a different physical address.
        Go to Start WriteSector.

The problem with this method of writing to a flash memory device is that while the flash memory device is busy programming the data bytes into the flash cells, the calling software application is stalled. Consider, for example, an application that uses a NAND flash device for storing data, via the following C-like pseudocode:

```
For ( I=0; I<1000; I++){
    generate 512 bytes of new data;
    write new data to flash;
}
```

Assuming a one millisecond page writing time, assuming that it takes the processor one millisecond to generate 512 bytes of new data, and ignoring both the time that the processor uses to run the looping code and the flash driver code and the time that it takes to pass the data from the processor to the flash memory device via the system bus, it follows that each iteration of this loop takes two milliseconds, not the one millisecond that the processor needs to generate the new data. This is because the processor is stalled while the flash memory device is busy programming the new data bytes into flash cells.

The reason that prior art flash device drivers insist on waiting until a flash operation completes before freeing the calling software to continue its own processing is that the operation may fail. For example, if a write operation fails, the flash device driver must retry the operation in a way that eventually allows the operation to succeed. Exactly how this is done varies from flash device driver to flash device driver, but it must be done. If a flash device driver does not verify the success of an operation before returning control to the calling application, then a flash failure might go undetected. Even if the flash failure would be detected later, there would be no way to correct it because by the time the failure is detected the application software is dealing with different data.

An alternative in a multi-tasking system is to have the flash memory device generate an interrupt upon completing its operation, to have the flash device driver yield control of the processor immediately following the beginning of the flash operation, and, when the flash device driver regains control following detection of the interrupt, to have the flash device driver check for failure and complete its part of the operation as above (including recovering from failure if necessary). This improves the efficiency of the system as a whole, because the processor is free to deal with tasks other than the application that called the flash device driver while the flash memory device is busy; but the calling application itself still is stalled while the flash memory device is busy.

There is thus a widely recognized need for, and it would be highly advantageous to have, a driver, of a flash memory device, that frees a calling application to continue its own processing while the flash memory device performs the called operation.

SUMMARY OF THE INVENTION

According to the present invention there is provided a method whereby a host accesses a data storage device during execution of an application program, including the steps of: (a) initiating a first access of the data storage device, by the host; (b) while the data storage device satisfies the first access, continuing the execution of the application program, by the host; and (c) querying the first access, by the host.

According to the present invention there is provided a computer readable storage medium having computer readable code embodied on the computer readable storage medium, the computer readable code including: (a) first code, for a driver of a data storage device, for querying a preceding access to the data storage device; and (b) second code, for the driver, for: if the querying indicates a failure of the preceding access, repeating the preceding access until the querying indicates a success of the preceding access; the first and second code being callable by an application program in a single call to the driver.

According to the present invention there is provided a computer readable storage medium having computer readable code embodied on the computer readable storage medium, the computer readable code including: (a) first code, for a driver of a data storage device, for querying a preceding access to the data storage device; and (b) second code, for the driver, for initiating a new access to the data storage device if the querying indicates a success of the preceding access; the first and second code being callable by an application program in a single call to the driver.

According to the present invention there is provided a method of accessing a data storage device, including the steps of: (a) providing an access command in an API of a driver of the data storage device; (b) providing a verification command in the API of the driver; (c) issuing the access command to initiate an access of the data storage device by the driver; and (d) subsequent to the issuing of the access command, issuing the verification command to verify a success of the access.

The first aspect of the present invention is a method by which a host accesses a data storage device during the execution of an application program. Typically, the method is implemented by a driver, of the data storage device, that runs on the host and that is called by the application program. As understood herein, to "access" the data storage device means to write data to the data storage device, to read data from the data storage device, or to erase at least a portion of the data storage device. First, the host initiates such an access. Then, while the data storage device is satisfying the access, i.e., while the data storage device performs the write read or erase operation requested by the host, the host continues to execute the application program without first waiting for the data storage device to complete its own operation. The host also queries the first access. Here and elsewhere, "querying" an access means determining whether the access succeeded or failed.

Preferably, the host continues to execute the application program until a second access of the data storage device is required by the application program. The host queries the first access prior to the second access, and initiates the second access only if the query of the first access indicates that the first access has succeeded. If the first access has failed, then the host repeats the first access and the query thereof until the first access succeeds. Here and elsewhere, "repeating" an access means performing an operation on the data storage device that accomplishes the intent of the access that is being repeated, whether or not the same physical portion of the data storage device is addressed in both the original access and the repeated access. For example, if the original access is a write of a sector of data to the data storage device, then a failure of the original access probably means that the physical page being written to has become unusable, so the repeated access is an attempt to write the same sector of data to a different physical page of the data storage device.

Preferably, if the first access is a write, then before the first access is completed, the host first saves the data, that is to be written to the data storage device, in a separate memory such as a RAM or another non-volatile storage device, so that if the first access fails, the data is available for use when the first access is repeated until it succeeds.

Preferably, the first access includes a plurality of sub-accesses of respective portions of the data storage device. For example, a read access could be a request to read data from a plurality of pages of the data storage device, a write access could be a request to write data to a plurality of pages of the data storage device, and an erase access could be a request to erase a plurality of blocks of the data storage device. In that case, the query prior to the second access is only of the last sub-access of the first access. Most preferably, before each sub-access subsequent to the first sub-access, the host queries the preceding sub-access and repeats the preceding sub-access, if necessary, until the preceding sub-access succeeds. If the first access is a write access, then before the first access is completed, the host saves, in a separate memory, only the data that is to be written to the data storage device in the last sub-access. Before a second access, only the last sub-access must be queried and repeated, using the saved data, because the other sub-accesses were queried, and repeated if necessary, as part of the first access.

Generally and preferably, the operations (accesses, queries, etc.) performed by the host, other than the execution of the application program, are effected by executing code of a driver of the data storage device.

Figure 1:
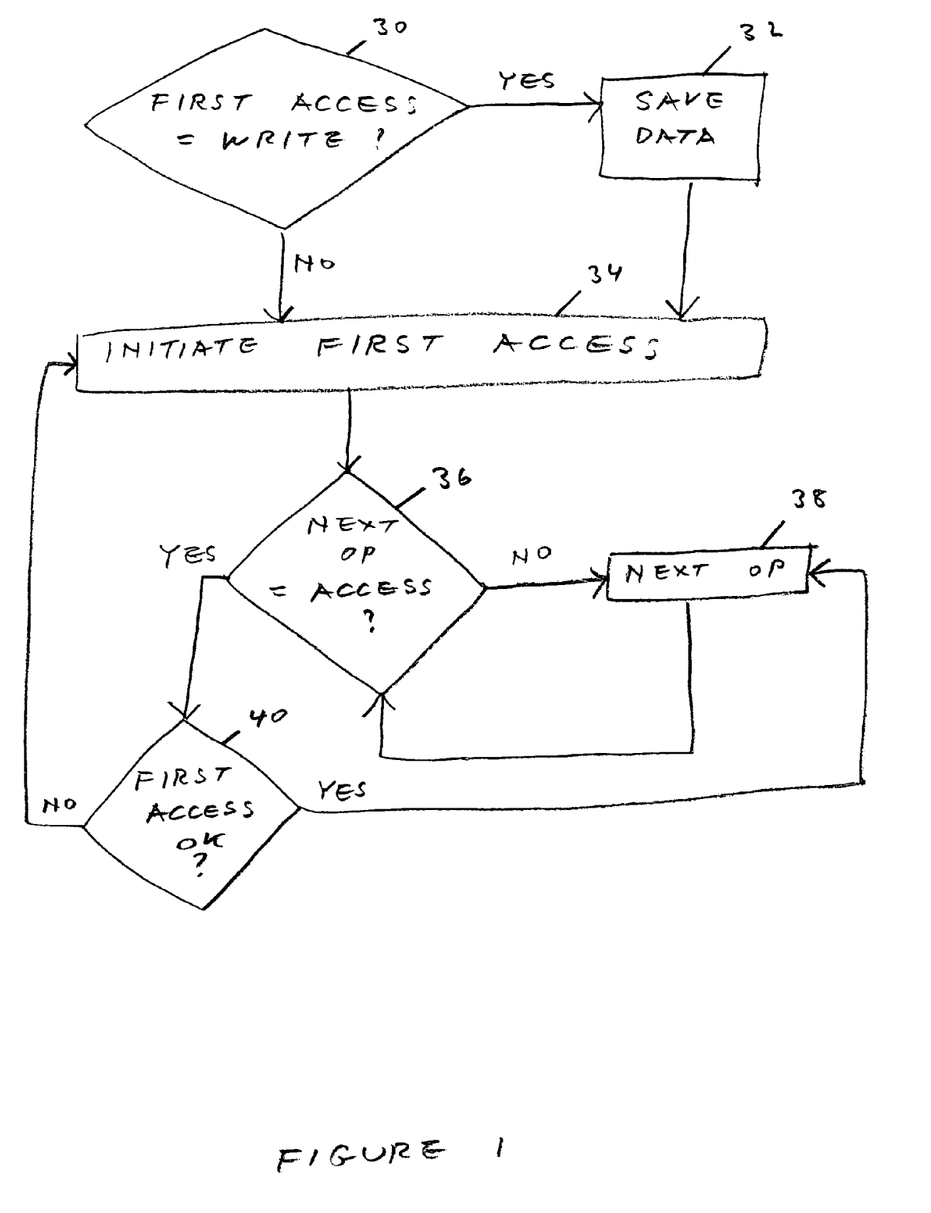
FIG. 1 is a flow chart of the first aspect of the present invention.

Referring now to the drawings, FIG. 1 is a flow chart of the first aspect of the present invention. In blocks 30 and 32, if the first access to the data storage device is to be a write, the host saves the data that are to be written. In block 34, the host initiates the first access. While the data storage device is satisfying the access, the host continues to execute the operations of the application program that needs to access the data storage device. In block 36, the host tests the next operation to see if that operation is an access of the data storage device. If the next operation is not an access of the data storage device then the next operation is executed in block 38. If the next operation is an access of the data storage device then the host queries the data storage device in block 40 to see if the first access succeeded. If the first access succeeded, then the host proceeds to the next access in block 38. Otherwise, the host repeats the first access in block 34.

The second aspect of the present invention is a computer readable storage medium in which is embodied computer readable code for a driver of a data storage device. This computer readable code includes first code for querying a preceding access to the data storage device and second code for, in case the preceding access failed, repeating the preceding access until the first code shows that the preceding access succeeds. Both the first code and the second code are callable by an application program in a single call to the driver.

Preferably, the computer readable code also includes third code for initiating a new access to the data storage device if, and most preferably only if, the first code shows that the preceding access succeeded. All three codes are callable by the application program in a single call to the driver.

As in the first aspect of the present invention, the preceding access and the new access could be writes to the data storage device, reads from the data storage device, or partial or total erasures of the data storage device. If the new access is a write of new data to the data storage device, then preferably the computer readable code also includes fourth code for saving the new data in a memory, such as a RAM or another non-volatile storage device, separate from the data storage device. All four codes are callable by the application program in a single call to the driver. Most preferably, if the preceding access was a write of preceding data to the data storage device, then the second code uses the preceding data, as saved by the fourth code during the preceding access, in repeating the preceding access.

Preferably, the computer readable code also includes multi-portion code for executing the first, second and third codes successively to access each of a plurality of portions of the data storage device. The multi-portion code, along with the first, second and third code, are callable together by an application program in a single call to the driver. If the accesses are writes or reads, then the portions are pages. If the accesses are erases, then the portions are blocks. Most preferably, if the accesses are writes of data to respective pages, then the computer readable code also includes fourth code for saving, in a memory separate from the data storage device, only the data to be written to the last page. All five codes are callable together by an application program in a single call to the driver.

A variant of the second aspect of the present invention, for use with data storage devices that use a mechanism other than repeated accesses to recover from failure, is a computer readable storage medium in which is embedded computer readable code, for a driver of a data storage device, that lacks the second code but includes both the first code and the third code.

The third aspect of the present invention is a method of accessing a data storage device, typically by an application program. Two commands are provided in an API of a driver of the data storage device: an access command and a verification command. The access command is for enabling an application program to initiate an access of the data storage device. The verification command is for determining whether the most recently requested access succeeded or failed. In addition, the verification command does not return control to the application program until the most recently requested access succeeds and the data storage device is not busy. (If the most recently requested access was for a read of the data storage device, then it usually is assumed that the access succeeded, so all the verification command does is wait until the data storage device is not busy before returning control to the application program.) Given these two commands, the method includes the step of issuing the access command to initiate a corresponding access of the data storage device; and also the subsequent step of issuing the verification command to verify the success of the access that was initiated by the access command. Preferably, if the access failed, the verification command repeats the access until it succeeds. Preferably, in executing the access command for a new access to the data storage device, the driver queries a preceding access to the data storage device. If this query indicates failure of the preceding access, the driver repeats the preceding access to the data storage device until the preceding access succeeds.

As in the first and second aspects of the present invention, the accesses could be writes, reads or erases, so that the access command could be a write command, a read command or an erase command. If the access is a write command for writing new data to the data storage device, then, preferably, as part of executing the access command, the driver saves the new data in a memory, such as a RAM or another non-volatile storage device, that is separate from the data storage device. Having effected such a save while writing preceding data during a preceding access, the driver, in executing the write command for the new data, uses the saved preceding data while repeating the preceding access if it is necessary to do so.

The access command could be for accessing a single portion of the data storage device or for accessing, successively, a plurality of portions of the data storage device. If the access is a read or a write, then the portions are pages. If the access is an erase, then the portions are blocks.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a driver, for a data storage device, that allows application software to continue to execute while an access by the application software to the data storage device is being handled. Specifically, the present invention can be used for efficient management of a flash memory device.

The principles and operation of a data storage device driver according to the present invention may be better understood with reference to the drawings and the accompanying description.

Although the specific example of a data storage device that is discussed herein is a flash memory device, the scope of the present invention extends to management of any data storage device to which the principles of the present invention are applicable.

Figure 2A:
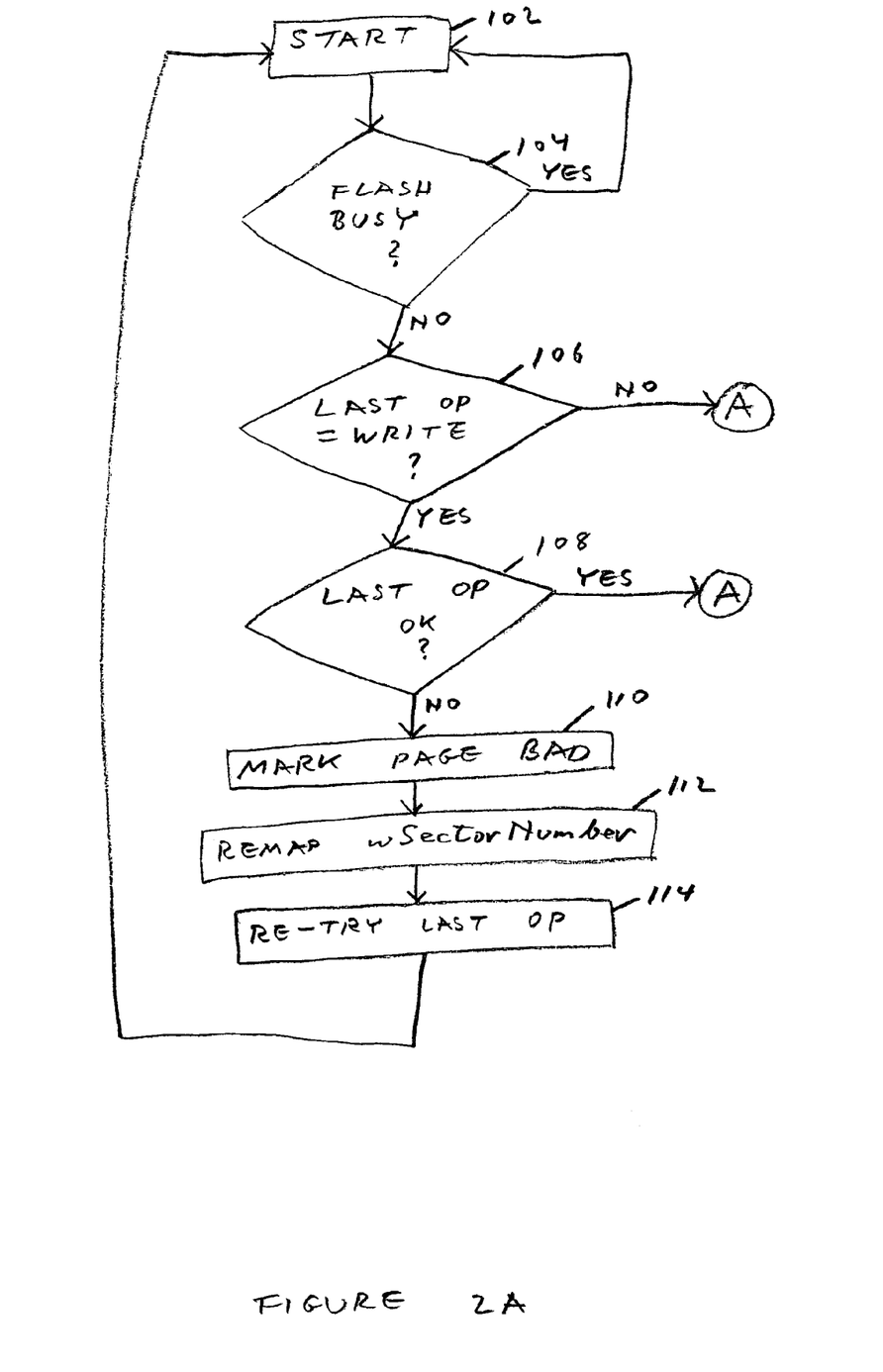
FIGS. 2A and 2B are a flow chart of WriteSector as modified according to the present invention.
Figure 2B:
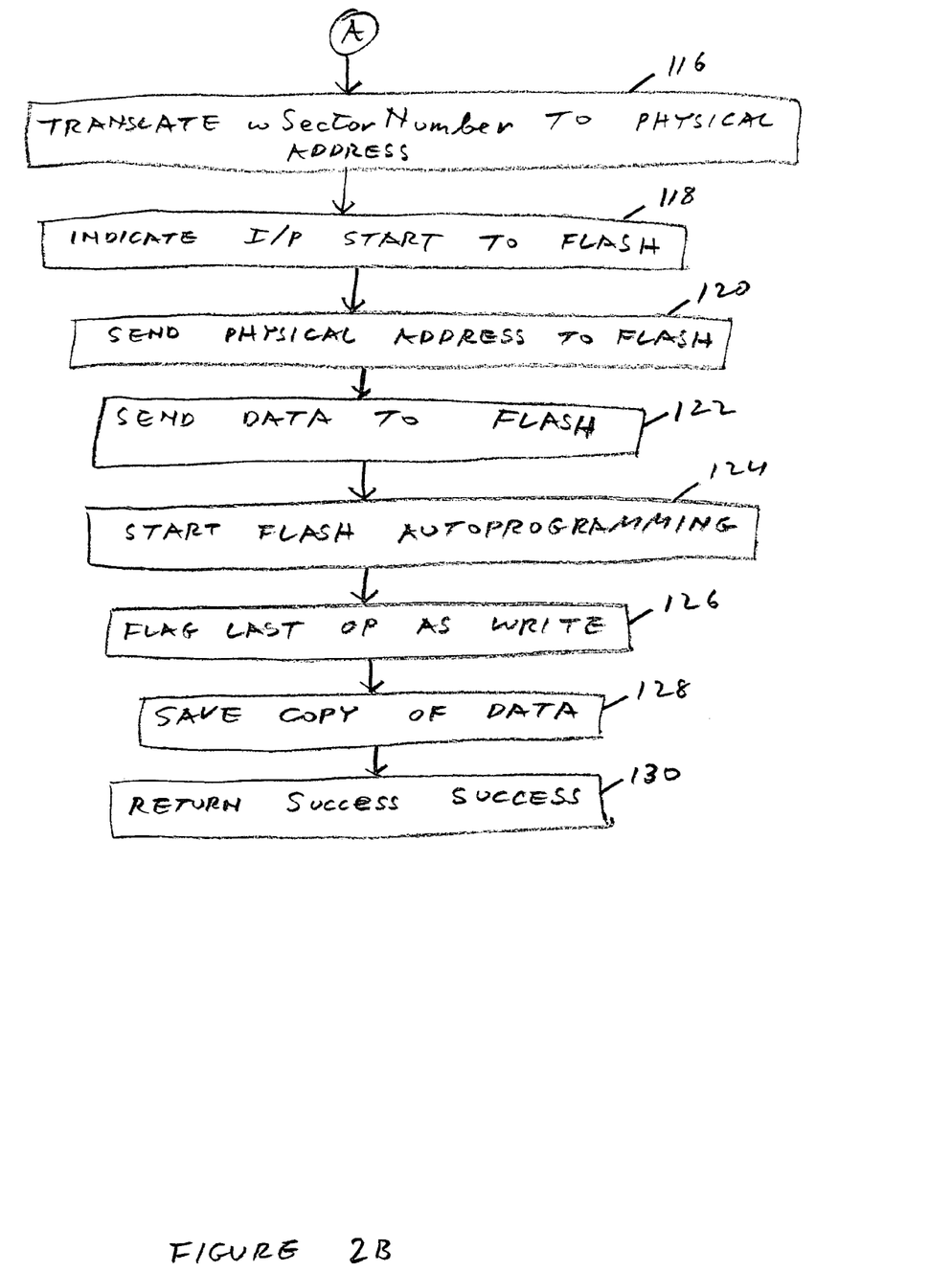

The basic idea of the present invention is to avoid waiting for a flash memory device to complete an operation before resuming execution of the application program that initiated the operation. Instead, the flash device driver returns control to the application program immediately after starting the flash operation. The problem of failure detection is handled by having the driver check for failure on the next driver call. If the current operation is a write, then the driver saves, in a location separate from the flash memory device, a copy of the current data sector that is supposed to be written to the flash memory device, and uses the saved copy for repeating the operation if such a repeat is necessary. The following pseudocode illustrates the logic of the present invention as applied to a write operation:

Start WriteSector: [102]
   Wait until the flash device is not in 'busy' state. [104]
   If the last flash operation was a write: [106]
     Then query the flash memory device for success of the last operation. [108]
   If failure
     Mark the failed physical page as bad to avoid reusing that page. [110]
     Re-define the address mapping so that wSectorNumber is mapped to a different physical address. [112]
     Re-try the previous operation with the previous data (this could be implemented as a recursive call to WriteSector) until the previous operation succeeds. [114]
     Go to Start WriteSector.
   Translate wSectorNumber to the physical address currently allocated for that logical address. [116]
   Send one command byte to the flash memory device, indicating the start of data input. [118]
   Send four bytes of physical address to the flash memory device. [120]
   Send the data bytes (typically including both the application program data bytes from pDataBuffer plus some control bytes attached to the data by the flash device driver) that are to be written to the flash memory device. [122]
   Send one command byte to the flash memory device to initiate auto-programming by the flash memory device. [124]
   Set a flag indicating that the last operation was a write. [126]
   Save a copy of the data just sent to the flash memory device. [128]
   Return from the call while setting Success to the success code. [130]

Returning now to the drawings, FIGS. 2A and 2B are a flow chart of this pseudocode of WriteSector. In the above pseudocode, the reference numerals in brackets refer to corresponding blocks in FIGS. 2A and 2B.

Figure 3:
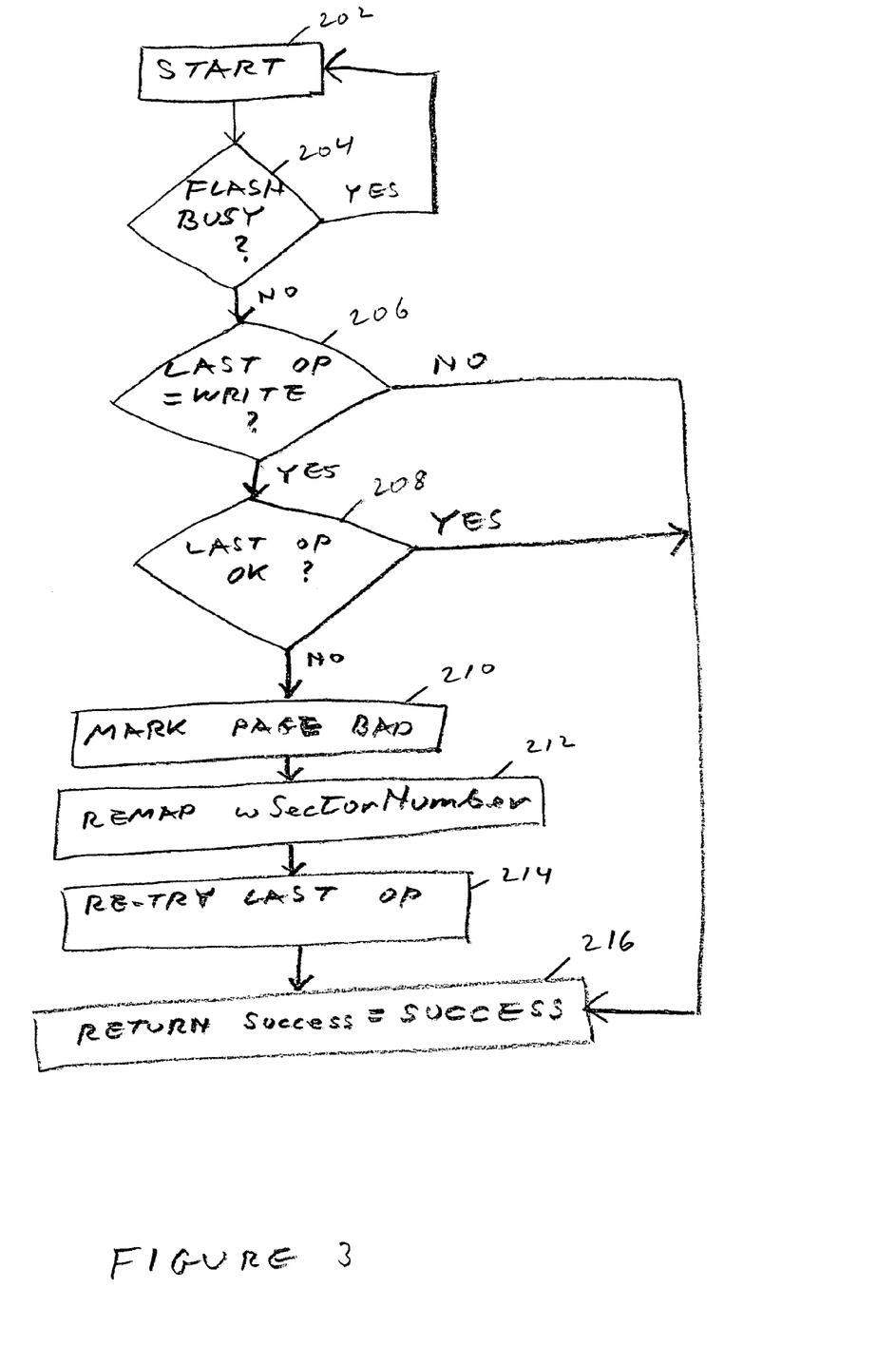
FIG. 3 is a flow chart of VerifyLastOperation.

This pseudocode is logically equivalent to the prior art WriteSector pseudocode, but allows the processor to do useful work for the calling application while the flash memory device is busy programming the data bytes. Nevertheless, there is one caveat. As long as the application generates a continuous stream of similar calls to the driver, there is no risk of not detecting a failed operation, because the call immediately following a failed call will detect and correct the failure. This is not true, however, for the last call. For example, in the iterative loop discussed above, the last iteration of the loop would generate a WriteSector call whose success is not verified. In order to handle this problem, a new function, called "VerifyLastOperation", is added to the flash device driver for the purpose of verifying the success of the last operation. This function merely checks the last operation for failure, handles any required recovery, and returns to the calling application. Its pseudocode is as follows:

Start VerifyLastOperation: [202]
   Wait until the flash device is not in 'busy' state. [204]
   If the last flash operation was a write: [206]
     Then query the flash memory device for success of the last operation. [208]
   If failure then:
     Mark the failed physical page as bad to avoid reusing that page. [210]
     Re-define the address mapping so that wSectorNumber is mapped to a different physical address. [212]
     Re-try the previous operation with the previous data until the previous operation succeeds. [214]
   Return from the call while setting Success to the success code. [216]

FIG. 3 is a flow chart of this pseudocode of VerifyLastOperation. In the above pseudocode, the reference numerals in brackets refer to corresponding blocks in FIG. 3.

The VerifyLastOperation function can be exported from the driver as an "IOCTL", which is a driver-specific mechanism provided by many operating systems, including Microsoft Windows™ and Linux, for making a special service available to applications. Other operating systems provide similar mechanisms. The application should call this function at the end of a sequence of write calls. For example, the present invention modifies the iterative loop discussed above to:

```
For ( I=0; I<1000; I++){
    generate 512 bytes of new data;
    write new data to flash;
}
VerifyLastOperation;
```

Note that the pseudocode of the present invention's WriteSector function could be modified to:

Start WriteSector:
   VerifyLastOperation.
   Translate wSectorNumber to the physical address currently allocated for that logical address.
   Send one command byte to the flash memory device, indicating the start of data input.
   Send four bytes of physical address to the flash memory device.
   Send the data bytes (typically including both the application program data bytes from pDataBuffer plus some control bytes attached to the data by the flash device driver) that are to be written to the flash memory device.
   Send one command byte to the flash memory device to initiate auto-programming by the flash memory device.
   Set a flag indicating that the last operation was a write.

Save a copy of the data just sent to the flash memory device.
Return from the call while setting Success to the success code.

The above pseudocode is for write operations. The same principle applies to erase operations, which also are quite slow. Long sequences of erase calls are less common than long sequences of write calls; but nevertheless there are cases in which it is useful to apply the principles of the present invention to erasing. It is trivial to modify the write operation pseudocode presented above to also cover erase operations.

The principles of the present invention also apply to read operations, provided that an important difference between read operations and write/erase operations is taken into account. Typically, flash reading is assumed to never fail, so that a read command never returns a failure status from the flash memory device. Therefore, in applying the present invention to reading, there is no need to check for failure, but only to verify that the last operation completed and that the flash memory device is no longer busy. In other words, a first call by the application program for reading a sector initiates the reading in the flash memory device and returns immediately without the data. The next read call verifies the completion of the first operation, retrieves the data from the flash memory device, initiates the next flash memory device read, and returns the data requested in the previous call. Even though this is somewhat more complicated, from the application point of view, than the write case, it nevertheless can be useful in speeding up a sequence of read operations.

NAND flash vendors often provide a feature that is similar in spirit to this aspect of the present invention: when the last byte of a sector is read from the flash memory device, a read of the next sequential page is automatically triggered, without any explicit command to do so. The motivation for this is similar to the motivation of the present invention: if the application reads pages sequentially from the flash memory device, time is saved by reading in parallel with the work of the processor. Nevertheless, this prior art "auto-read" feature is of only limited usefulness in that it is beneficial only for the case of reading from physically sequential pages, whereas the present invention speeds up read operations no matter what physical order the pages are in. Note that because of the vagaries of the mapping of virtual pages to physical pages, the order of the virtual pages recognized by the application is not necessarily, and usually in fact is not, the order of the corresponding physical pages in the flash memory device, so that when an application reads a long sequence of consecutive virtual pages, the mapping usually translates the sequence into a sequence of nonconsecutive physical pages. Therefore, the prior art "auto-read" feature is much less useful than might be expected.

Another reason why the present invention is less useful with regard to reading a flash memory device than with regard to writing or erasing a flash memory device is that an application program often needs the data it requests using a read command before it can continue with other useful work. Even if this is not so (for example, when an application program reads a large amount of data into RAM from a flash memory device before processing any of the data), the performance gain provided by the present invention with respect to reading is smaller than that provided with respect to writing to the flash memory device because reading a flash memory device typically is much faster than writing to a flash memory device. Therefore, in some preferred implementations of the present invention, the principles of the present invention are applied only to write and erase operations, and not to read operations.

Even when the present invention is not applied to read operations, it is necessary to avoid interference between read and write operations, because a flash memory device cannot read and write simultaneously and may use the same status bits for both kinds of operations. If due care is not taken, and a read command is inserted in the application between two write commands, then the read operation must wait for the first write operation to finish. The read operation also is liable to overwrite a failure status of the first write operation, which would prevent the second write operation from recognizing the failure of the first write operation. In order to protect against this, any driver function that accesses the flash memory device, or that could interfere with failure checking according to the present invention, should start with a call to VerifyLastOperation. This guarantees that if the immediately preceding operation was a write operation then the current operation functions correctly and that a successful recovery is made from any failure of the immediately preceding operation.

Theoretically, the present invention speeds up the iterative loop discussed above by a factor of two. Each iteration now takes only one millisecond instead of two milliseconds. Of course, in practice this level of improvement is almost never achieved because the programming time of the flash memory device generally is not equal to the data generation time and because of the other factors (time for moving data over the bus that connects the host to the flash memory device, time used by the flash device driver for address translation, etc.) that were ignored for the sake of conceptual simplicity in the discussion above of the iterative loop. Nevertheless, the present invention results in a significant improvement in performance in many real-life cases.

The above discussion of the present invention is in the context of single-sector calls. In the multi-sector case, a typical format for a write command is:

Status = WriteMultipleSectors(bDriveID,wSectorNumber,bSectorsCount, pDataBuffer)

where wSectorNumber now identifies the first sector to write and bSectorCount is the number of sectors to be written. As in the single sector command format, Status is set to a success/failure code on return from the call, and bDriveID identifies the data storage device. The buffer pointed to by pDataBuffer contains the data to be written to all bSectorCount sectors.

A simple way to implement such a function internally within the driver is as bSectorCount calls to WriteSector. This results in the driver waiting internally for the completion of all but the last sector write operation, while returning to the calling application immediately after starting the programming of the last sector. The performance gain of this implementation of a multi-sector write is smaller than the performance gain of a single-sector write according to the present invention. Whether it is better to code the calling application program with one call to WriteMultipleSectors or with bSectorCount calls to WriteSector is application-specific. If there is a lot of processing to do between sector writes, and especially if the processing time is of the same order of magnitude as the flash memory device programming time, then bSectorCount calls to WriteSector are preferred. If there is very little processing to do before generating a new sector, then a single call to WriteMultipleSectors is preferred, to simplify the application source code.

Another disadvantage of the simple implementation of WriteMultipleSectors is that each sector must be saved by the driver for use in case of failure. Such saving is justified in the single sector case, as each sector "benefits" from the driver not waiting for the programming of the sector's data to the flash cells before returning control to the calling application. In the multi-sector case, however, only the last sector benefits, while all sectors pay the penalty of having to be saved for use in case of failure.

A preferred implementation of WriteMultipleSectors is as a dedicated multi-sector function. This function waits for the completion of the writing of each sector written by a call except for the last sector, and so needs to save only the last sector for use in case of failure.

Figure 4:
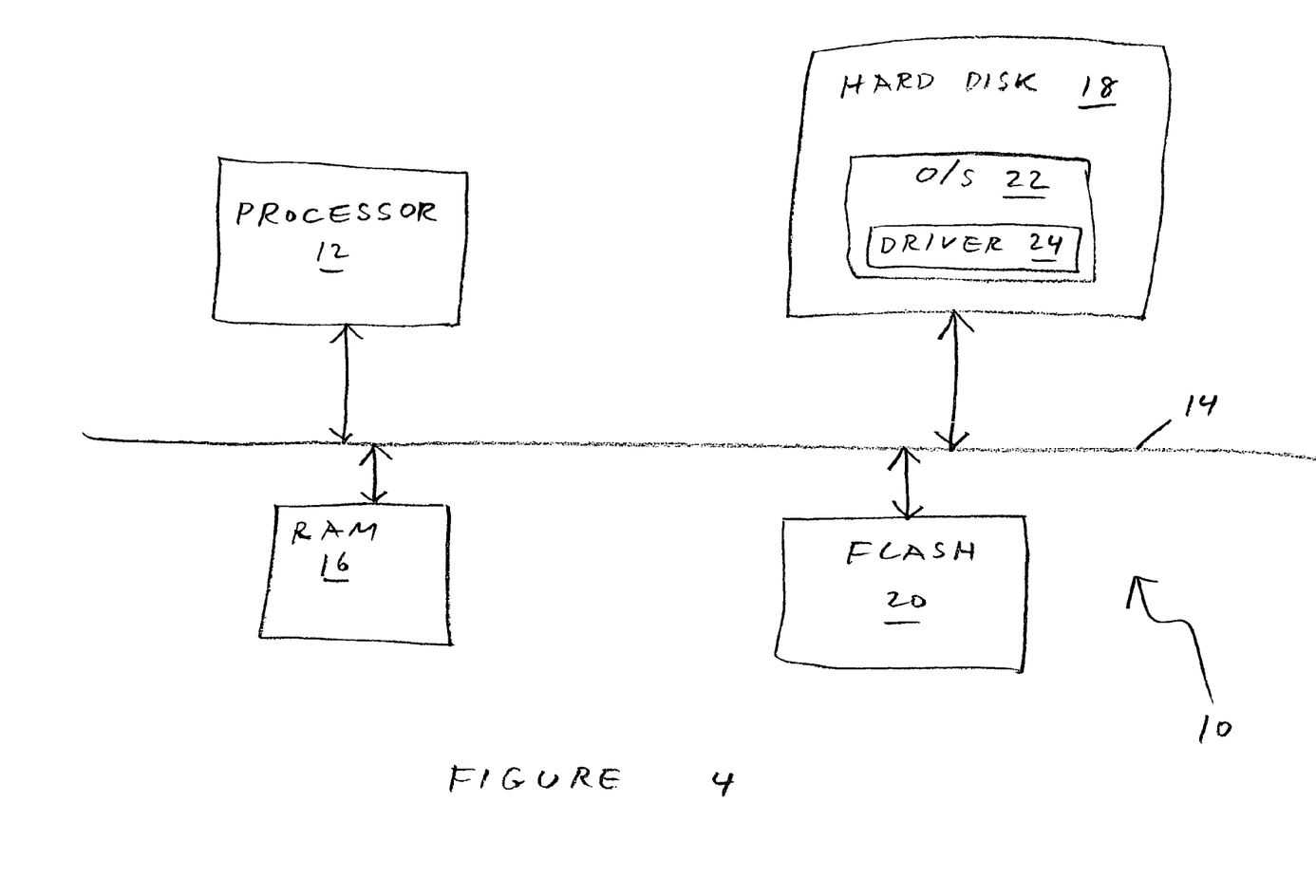
FIG. 4 is a partial schematic block diagram of a computer system that uses a device driver of the present invention to manage a flash memory device.

FIG. 4 is a partial schematic block diagram of a computer system 10 that uses the device driver of the present invention to manage a flash memory device. Computer system 10 includes a processor 12, a random access memory (RAM) 16, a hard disk 18 and a flash memory device 20, all of which communicate with each other on a bus 14. A portion of hard disk 14 is used to store an operating system 22 that includes a flash device driver 24 of the present invention for flash memory device 20. Computer system 10 exclusive of flash memory device 20 is an example of a host that accesses flash memory device 20. Hard disk 18 is an example of a computer readable storage medium in which is embedded the code of flash device driver 24.

When computer system 10 boots, processor 12 loads operating system 22, including driver 24, to RAM 16. All subsequent operation of computer system 10 is under the supervision of operating system 22. In particular, when processor 12 executes application programs that use flash memory device 20, the application programs call the read, write and erase commands of flash device driver 24 to read data from flash memory device 20, write data to flash memory device 20 and erase data from flash memory device 20. When processor 12 executes the code of flash device driver 24 for writing data to flash memory device 20, processor 12 also saves the data in RAM 16, as described above, in case the write fails and that data is needed to repeat the write.

Computer system 10 is an example of a system with two nonvolatile memories: hard disk 18 and flash memory device 20. Flash memory device 20 is more reliable than hard disk 18 and so is used to store vital data. There also are computer systems that use flash memory devices as their sole nonvolatile memories. For example, because reading from a NOR flash memory device is random-access and fast, operating system 22 could be stored in a NOR flash memory device and executed directly from the NOR flash memory device upon system boot. Flash device driver 24 still would be needed in such a computing system, for managing the portion of the NOR flash memory device that is used for data storage rather than for storing operating system 22. Flash device driver 24 also would be needed for updating operating system 22.

While the invention has been described with respect to a limited number of embodiments, it will be appreciated that many variations, modifications and other applications of the invention may be made.

What is claimed is:

1. A method whereby a host accesses a data storage device during execution of an application program, comprising the steps of:
   (a) storing, in an executable memory of the host, a software device driver of the data storage device:
   (b) initiating a first access of the data storage device, by the host executing code of said software device driver;
   (c) while the data storage device satisfies said first access, continuing the execution of the application program, by the host, until a second access of the data storage device is required by the application program; and
   (d) querying a success of said first access prior to said second access, by the host executing code of said software device driver.

2. The method of claim 1, further comprising the step of:
   (d) initiating said second access, by the host;
and wherein said initiating of said second access is contingent on said querying indicating a success of said first access.

3. The method of claim 2, further comprising the step of:
   (e) if said querying indicates a failure of said first access, repeating said first access and said querying, by the host, until said querying indicates a success of said first access.

4. The method of claim 1, wherein said first access is a write of data to the data storage device.

5. The method of claim 4, further comprising the steps of:
   (d) prior to completion of said first access, saving said data in a memory, by the host; and
   (e) if said querying indicates a failure of said first access, repeating said first access and said querying, by the host, using said saved data, until said querying indicates a success of said first access.

6. The method of claim 1, wherein said first access is a read of data from the data storage device.

7. The method of claim 1, wherein said first access is an erase of data in the data storage device.

8. The method of claim 1, wherein said first access includes a plurality of successive sub-accesses of respective portions of the data storage device, and wherein said querying is effected after a last said sub-access to query only said last sub-access.

9. The method of claim 8, wherein said first access includes: prior to each said sub-access subsequent to a first said sub-access:
   (i) querying a success of said sub-access that immediately precedes said each sub-access; and
   (ii) if said querying indicates a failure of said immediately preceding sub-access, repeating said immediately preceding sub-access until said querying indicates a success of said immediately preceding sub-access.

10. The method of claim 8, wherein said portions are pages of the data storage device, and wherein said sub-accesses are writes of data to respective said pages.

11. The method of claim 10, further comprising the steps of:
   (d) prior to completion of said first access, saving, in a memory, only said data that is to be written in said last sub-access, by the host; and
   (e) if said querying indicates a failure of said first access, repeating said last sub-access and said querying, by the host, using said saved data, until said querying indicates a success of said last sub-access.

12. The method of claim 8, wherein said portions are pages of the data storage device, and wherein said sub-accesses are reads of data from respective said pages.

13. The method of claim 8, wherein said portions are blocks of the data storage device, and wherein said sub-accesses are erases of respective said blocks.

14. A computer readable storage medium having computer readable code embodied on the computer readable storage medium, the computer readable code comprising:
   (a) first code, for a software device drivers, of a data storage device, that is executed by a host of said data storage device, for querying a success of a preceding access to said data storage device;
   (b) second code, for said software device driver, for: if said querying indicates a failure of said preceding access, repeating said preceding access until said querying indicates a success of said preceding access; and (c) third code, for said software device driver, for initiating a new access to said data storage device if said querying indicates a success of said preceding access;

said first, second and third code being callable by an application program, that is executed by said host and that accesses said data storage device, in a single call to said device driver.

15. The computer readable storage medium of claim 14, wherein said third code initiates said new access only if said querying indicates a success of said preceding access.

16. The computer readable storage medium of claim 14, wherein said new access is a write of new data to said data storage device.

17. The computer readable storage medium of claim 16, wherein the computer readable code further comprises:

(d) fourth code, for said device driver, for saving said new data in a memory separate from said data storage device;

said first, second, third and fourth code being callable by an application program in a single call to said device driver.

18. The computer readable storage medium of claim 17, wherein said preceding access is a write of preceding data to said data storage device, and wherein said second code, in repeating said preceding access, writes, to said data storage device, said preceding data that were saved in said memory by said fourth code during said preceding access.

19. The computer readable storage medium of claim 14, wherein said new access is a read from said data storage device.

20. The computer readable storage medium of claim 14, wherein said new access is an erase of at least a portion of said data storage device.

21. The computer readable storage medium of claim 14, wherein the computer readable code further comprises:

(d) multi-portion code, for said device driver, for executing said first, second and third code successively for accessing each of a plurality of portions of said data storage device;

said first, second, third and multi-portion code being callable by an application program in a single call.

22. The computer readable storage medium of claim 21, wherein said accesses are writes of data to respective pages of said data storage device.

23. The computer readable storage medium of claim 22, wherein the computer readable code further comprises:

(e) fourth code, for said device driver, for saving only said data of a last said write in a memory separate from said data storage device;

said first, second, third fourth and multi-portion code being callable by an application program in a single call.

24. The computer readable storage medium of claim 21, wherein said accesses are reads from respective pages of said data storage device.

25. The computer readable storage medium of claim 21, wherein said accesses are erases of respective blocks of said data storage device.

26. The computer readable storage medium of claim 14, wherein said preceding access is a write to said data storage device.

27. The computer readable storage medium of claim 14, wherein said preceding access is a read from said data storage device.

28. The computer readable storage medium of claim 14, wherein said preceding access is an erase of at least a portion of said data storage device.

29. A computer readable storage medium having computer readable code embodied on the computer readable storage medium, the computer readable code comprising:

(a) first code, for a software device drivers of a data storage device, that is executed by a host of said data storage device, for querying a success of a preceding access to said data storage device; and (b) second code, for said software device driver, for initiating a new access to said data storage device if said querying indicates a success of said preceding access;

said first and second code being callable by an application program, that is executed by said host and that accesses said data storage device, in a single call to said device driver.

30. The computer readable storage medium of claim 29, wherein said second code initiates said new access only if said querying indicates a success of said preceding access.

31. The computer readable storage medium of claim 29, wherein said new access is a write to said data storage device.

32. The computer readable storage medium of claim 29, wherein said new access is a read from said data storage device.

33. The computer readable storage medium of claim 29, wherein said new access is an erase of at least a portion of said data storage device.

34. The computer readable storage medium of claim 29, wherein the computer readable code further comprises:

(d) multi-portion code, for said device driver, for executing said first and second code successively for accessing each of a plurality of portions of said data storage device;

said first, second and multi-portion code being callable by an application program in a single call.

35. The computer readable storage medium of claim 34, wherein said accesses are writes of data to respective pages of said data storage device.

36. The computer readable storage medium of claim 34, wherein said accesses are reads from respective pages of said data storage device.

37. The computer readable storage medium of claim 34, wherein said accesses are erases of respective blocks of said data storage device.

38. The computer readable storage medium of claim 29, wherein said preceding access is a write to said data storage device.

39. The computer readable storage medium of claim 29, wherein said preceding access is a read from said data storage device.

40. The computer readable storage medium of claim 29, wherein said preceding access is an erase of at least a portion of said data storage device.

41. A method of accessing a data storage device, comprising the steps of:

(a) providing an access command in an Application Programming Interface of a software device driver of the data storage device;

(b) storing said software device driver in an executable memory of a host of the data storage device; and (c) issuing said access command, by an application program that is executed by said host, to initiate an access of the data storage device by said device driver;

wherein, when said host executes said access command for a new access to the data storage device:

(i) said host executes code of said software device driver to query a success of a preceding access to the data storage device; and (ii) if said querying indicates a failure of said preceding access, said host executes code of said software device driver to repeat said preceding access until said querying indicates a success of said preceding access.

42. The method of claim 41, wherein said access command is a write command.

43. The method of claim 41, wherein said access command is a read command.

44. The method of claim 41, wherein said access command is an erase command.

45. The method of claim 41, wherein said access command for said new access is a write command for writing new data to the data storage device, and wherein, in executing said access command for said new access to the data storage device:

(iii) said device driver also saves said new data in a memory separate from said data storage device.

46. The method of claim 45, wherein said preceding access is a write of preceding data to the data storage device, and wherein, in executing said access command for said new access to the data storage device, said repeating of said preceding access includes writing, to the data storage device, said preceding data as saved in said memory by said device driver during said preceding access.

47. The method of claim 41, wherein said access command is for accessing a single portion of the data storage device.

48. The method of claim 47, wherein said access command is a write command, and wherein said single portion is a page of the data storage device.

49. The method of claim 47, wherein said access command is a read command, and wherein said single portion is a page of the data storage device.

50. The method of claim 47, wherein said access command is an erase command, and wherein said single portion is a block of the data storage device.

51. The method of claim 41, wherein said access command is for accessing, successively, a plurality of portions of the data storage device.

52. The method of claim 41, further comprising the steps of:

(c) providing a verification command in said Application Programming Interface of said device driver; and (d) subsequent to said issuing of said access command, issuing said verification command to verify a success of said access.

53. The method of claim 52, wherein, in executing said verification command to verify said success of said access:

(i) said device driver queries said success of said access; and (ii) if said querying indicates a failure of said access, said device driver repeats said access until said querying indicates a success of said access.

* * * * *